United States Patent
Hamasako (10) Patent No.: US 6,897,708 B2
(45) Date of Patent: May 24, 2005

(54) SEMICONDUCTOR BOOSTER CIRCUIT REQUIRING NO TRANSISTOR ELEMENTS HAVING A BREAKDOWN VOLTAGE OF SUBSTANTIALLY TWICE THE POWER SUPPLY VOLTAGE

(75) Inventor: Shuki Hamasako, Kanagawa (JP)

(73) Assignee: NEC Electronics Corporation, Kawasaki (JP)

( * ) Notice: Subject to any disclaimer, the term of this patent is extended or adjusted under 35 U.S.C. 154(b) by 0 days.

(21) Appl. No.: 10/305,689

(22) Filed: Nov. 27, 2002

(65) Prior Publication Data
US 2003/0098737 A1 May 29, 2003

(30) Foreign Application Priority Data
Nov. 29, 2001 (JP) ........................................ 2001-364546

(51) Int. Cl.[7] .................................................. G05F 1/10
(52) U.S. Cl. ...................................... 327/536; 327/539
(58) Field of Search ................................ 327/536, 537; 363/59, 60

(56) References Cited

U.S. PATENT DOCUMENTS

| | | | | |
|---|---|---|---|---|
| 5,196,996 A | * | 3/1993 | Oh ............................ | 363/60 |
| 5,367,489 A | * | 11/1994 | Park et al. ................ | 365/189.11 |
| 5,406,523 A | * | 4/1995 | Foss et al. .................. | 365/226 |
| 5,436,587 A | * | 7/1995 | Cernea ....................... | 327/536 |
| 5,502,415 A | * | 3/1996 | Matsui et al. ............... | 327/536 |
| 6,208,196 B1 | | 3/2001 | St. Pierre | |
| 6,356,501 B2 | * | 3/2002 | Park et al. ................... | 365/226 |
| 6,476,666 B1 | * | 11/2002 | Palusa et al. ............... | 327/536 |
| 6,480,057 B2 | * | 11/2002 | Ogura ......................... | 327/536 |
| 6,498,527 B2 | * | 12/2002 | Matsumoto ................. | 327/536 |
| 6,545,529 B2 | * | 4/2003 | Kim ............................ | 327/536 |

* cited by examiner

Primary Examiner—Terry D. Cunningham
(74) Attorney, Agent, or Firm—Katten Muchin Zavis Rosenman (57) ABSTRACT

A semiconductor booster circuit is disclosed that boosts a power-supply voltage to approximately twice the original voltage. When a reference clock signal is at the ground voltage, an inverted clock signal becomes the power-supply voltage, and the power-supply voltage is conducted from the power supply input terminal by way of a third FET transistor and stored in a first capacitor, and the stored voltage of a second capacitor is delivered from an external output terminal by way of a second FET transistor. Conversely, when the reference clock signal is at the power-supply voltage, the power-supply voltage is conducted from the power supply input terminal by way of a fourth FET transistor and stored in the second capacitor, and the stored voltage of the first capacitor is delivered from the external output terminal by way of the first FET transistor.

4 Claims, 7 Drawing Sheets

Fig. 5C  VPP=5.9V

SEMICONDUCTOR BOOSTER CIRCUIT REQUIRING NO TRANSISTOR ELEMENTS HAVING A BREAKDOWN VOLTAGE OF SUBSTANTIALLY TWICE THE POWER SUPPLY VOLTAGE

BACKGROUND OF THE INVENTION

1. Field of the Invention

The present invention relates to a semiconductor booster circuit for stepping up voltage to substantially twice the power supply voltage, and to a step-up power supply device equipped with the semiconductor booster circuit.

2. Description of the Related Art

Data storage devices such as EEPROM (Electrically Erasable Programmable ROM) and flash memory are currently used in various data processing devices. FeRAM (Ferroelectric Random Access Memory) is also being investigated for use in these data storage devices. However, the power supply voltage of a typical data processing device is 3.0 V, and the voltage necessary for writing and erasing data on a FeRAM is substantially twice this voltage. Therefore, a booster circuit is typically used to double the voltage, and a booster circuit constituted by semiconductor elements is one type of such a booster circuit.

However, a semiconductor booster circuit of the prior art suffers from a disadvantage that in order to step up the power supply voltage to, for example, substantially twice the original voltage, it requires transistors having the breakdown voltage for this doubled voltage, decreasing the productivity of such circuits.

SUMMARY OF THE INVENTION

It is an object of the present invention to provide a semiconductor booster circuit that can substantially double the power supply voltage without requiring the use of semiconductor elements having a breakdown voltage of substantially twice the power supply voltage, and a step-up power supply device provided with the semiconductor booster circuit.

According to first and second aspects of the present invention, a semiconductor booster circuit comprises a power supply input terminal, a clock input terminal, a clock inverting circuit, a first capacitor, a second capacitor, a first FET (Field Effect Transistor) transistor, a second FET transistor, a third FET transistor, a fourth FET transistor, and an external output terminal.

The clock input terminal receives a reference clock signal of a predetermined duty cycle that alternates between the power-supply voltage and a ground voltage. The reference clock signal is inverted by the clock inverting circuit.

When the reference clock signal is at the ground voltage, the inverted clock signal becomes the power supply voltage and the third FET transistor of a second conduction type turns on while the fourth FET transistor of the second conduction type turns off, whereby the second FET transistor of a first conduction type turns on and the first FET transistor of the first conduction type turns off. As a result, the power-supply voltage is conducted from the power supply input terminal by way of the third FET transistor and stored in the first capacitor, and the stored voltage of the second capacitor is delivered from the external output terminal by way of the second FET transistor.

When the reference clock signal is at the power-supply voltage, the inverted clock signal becomes the ground voltage, and the third FET transistor therefore turns off and the fourth FET transistor turns on, whereby the second FET transistor turns off and the first FET transistor turns on. As a result, the power-supply voltage is conducted from the power supply input terminal by way of the fourth FET transistor and stored in the second capacitor, and the stored voltage of the first capacitor is delivered from the external output terminal by way of the first FET transistor.

As described in the foregoing explanation, the alternating output to the outside of a voltage obtained by adding the power-supply voltage of the inverted clock signal to the stored voltage of the second capacitor that has been stored by the power-supply voltage and a voltage obtained by adding the power-supply voltage of the reference clock signal to the stored voltage of the first capacitor that has been stored by the power-supply voltage enables a voltage of substantially twice the power-supply voltage to be continuously delivered without requiring FET transistors having a breakdown voltage of substantially twice the power-supply voltage.

In the second aspect of the present invention in particular, the application of the power-supply voltage from the power supply input terminal to the gate electrodes and source electrodes of the third and fourth FET transistors allows a less complex wiring structure than in the semiconductor booster circuit of the first aspect and allows a reduction of the load of the reference clock signal.

According to the third aspect of the present invention, when the reference clock signal is at the ground voltage, the inverted clock signal becomes the power-supply voltage, turning on second FET transistor while turning off the first FET transistor. As a result, the power-supply voltage is conducted from the power supply input terminal by way of the first diode and stored in the first capacitor, and the stored voltage of the second capacitor is delivered from the external output terminal by way of the second FET transistor.

When the reference clock signal is at the power-supply voltage, the inverted clock signal becomes the ground voltage, turning off the second FET transistor and turning on the first FET transistor. As a result, the power-supply voltage is conducted from the power supply input terminal by way of the second diode and stored in the second capacitor, and the stored voltage of the first capacitor is delivered from the external output terminal by way of the first FET transistor.

As described in the foregoing explanation, the alternating output to the outside of a voltage obtained by adding the power-supply voltage of the inverted clock signal to the stored voltage of the second capacitor that results from the power-supply voltage and a voltage obtained by adding the power-supply voltage of the reference clock signal to the stored voltage of the first capacitor that results from the power-supply voltage results in the continuous output of a voltage that is substantially twice the power-supply voltage.

Finally, according to the third aspect of the present invention, the application of the power-supply voltage from the first and second diodes to the first and second capacitors enables a wiring structure that is even less complex than in the semiconductor booster circuit of the first and second aspects.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1:
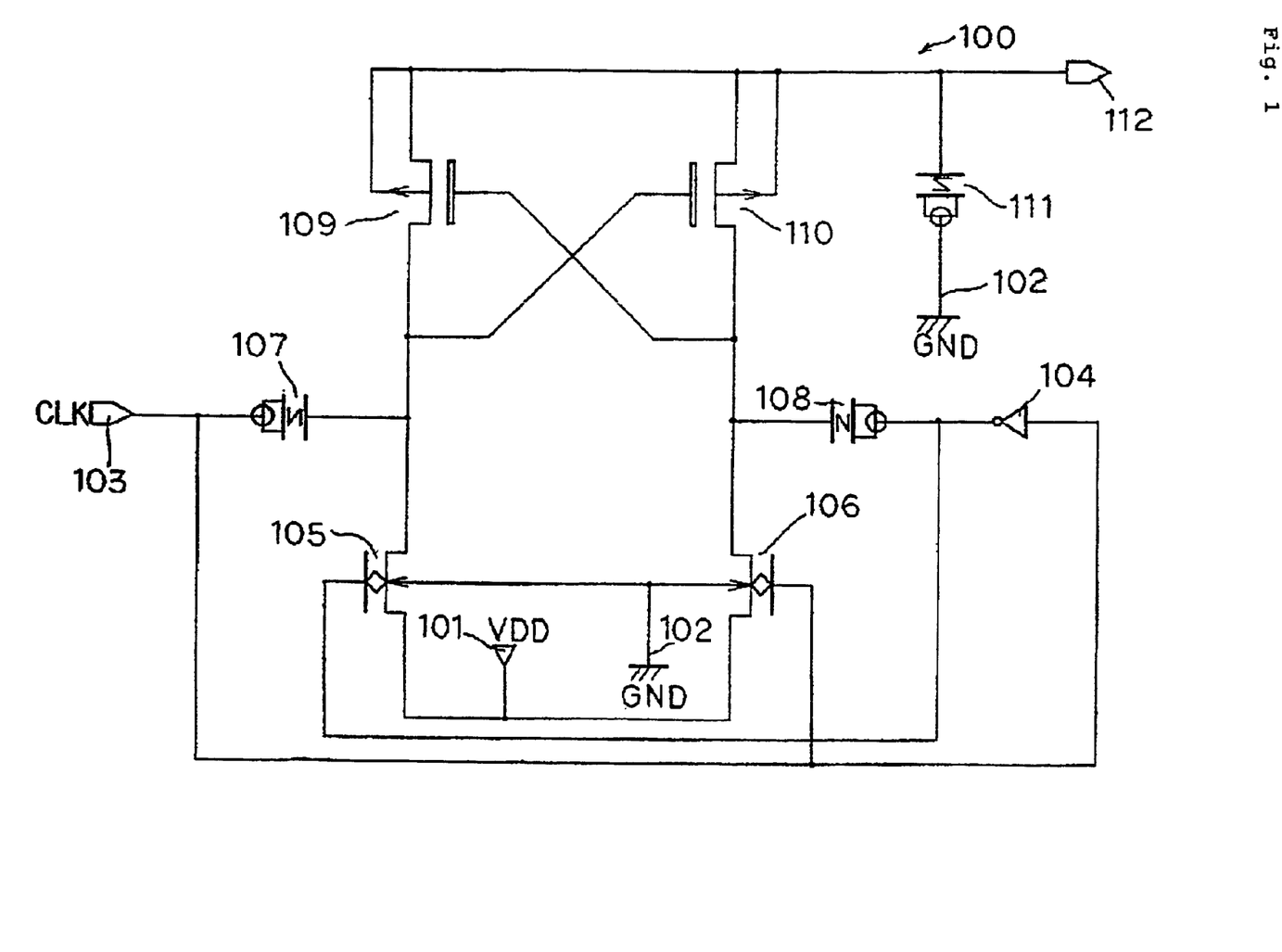
FIG. 1 is a circuit diagram of a semiconductor booster circuit according to a first embodiment of the present invention.

Referring now to FIG. 1, semiconductor booster circuit 100 according to a first embodiment of the present invention includes: power supply input terminal 101; ground potential terminal 102; clock input terminal 103; inverter 104; n-channel FET transistor 105, which is the third FET transistor; n-channel FET transistor 106, which is the fourth FET transistor; capacitor 107, which is the first capacitor; capacitor 108, which is the second capacitor; p-channel FET transistor 109, which is the first FET transistor; p-channel FET transistor 110, which is the second FET transistor; capacitor 111, which is the third capacitor; and external output terminal 112.

Figure 2:
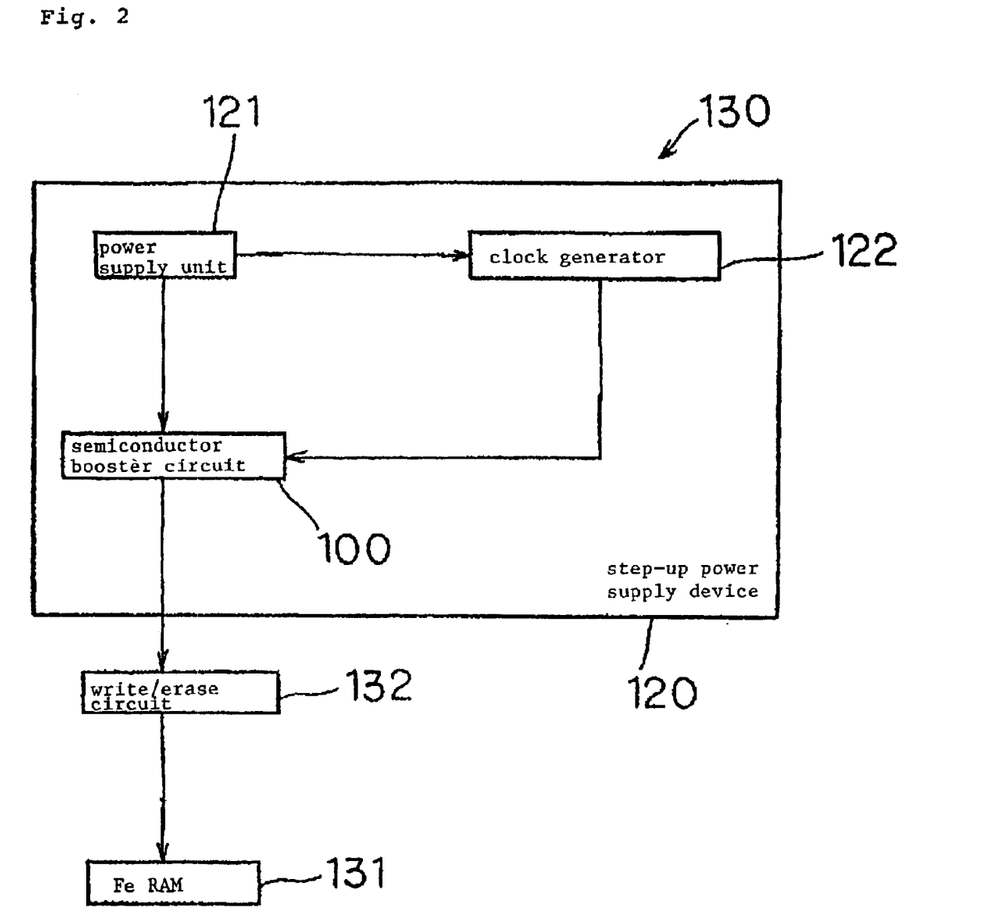
FIG. 2 is a block diagram showing the structure of the data storage device of the embodiment shown in FIG. 1.

As shown in FIG. 2, semiconductor booster circuit 100 is included in step-up power supply device 120, and step-up power supply device 120 is included in data storage device 130.

In addition to semiconductor booster circuit 100, step-up power supply device 120 includes power supply unit 121 and clock generator 122; and in addition to step-up power supply device 120, data storage device 130 includes FeRAM 131 and write/erase circuit 132.

Figure 3A:
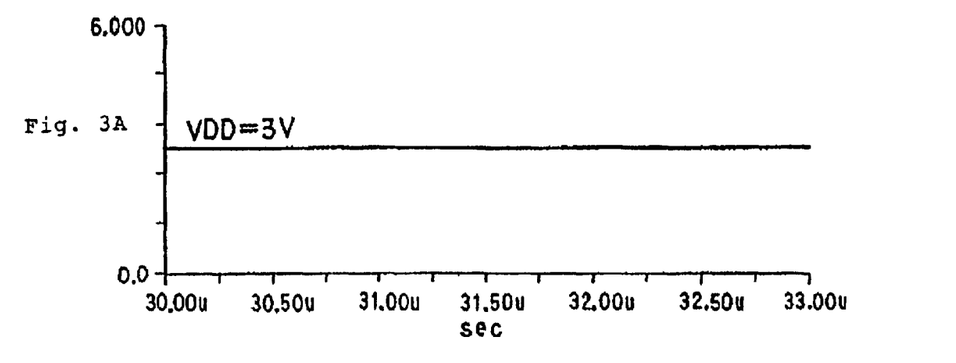
FIGS. 3A to 3C are waveform charts showing the relation among the power-supply voltage, the reference clock signal, and the inverted clock signal.
Figure 3B:
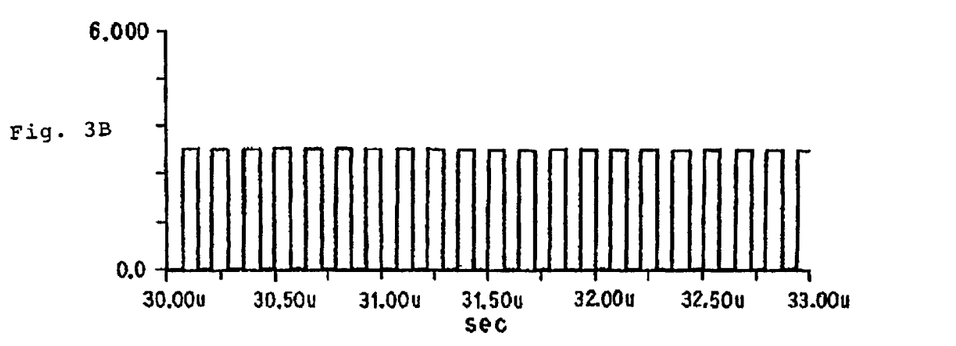

Power supply unit 121 is constituted by a dc power supply such as a secondary battery, and as shown in FIG. 3A, continuously generates a typical 3.0 V power supply voltage. Clock generator 122 is supplied with the power supply voltage from power supply unit 121, and as shown in FIG. 3B, generates a reference clock signal of a predetermined duty cycle that alternates between the power-supply voltage and the ground voltage.

Semiconductor booster circuit 100 receives as input both the power-supply voltage from power supply unit 121 and the reference clock signal from clock generator 122 and provides a doubled voltage in which the power-supply voltage has been substantially doubled. Data writing and data erasing are performed on FeRAM 131 at a voltage that is substantially twice that of the typical power-supply voltage. Write/erase circuit 132 performs data writing and data erasing in FeRAM 131 at the doubled voltage that is supplied from semiconductor booster circuit 100.

Figure 3C:
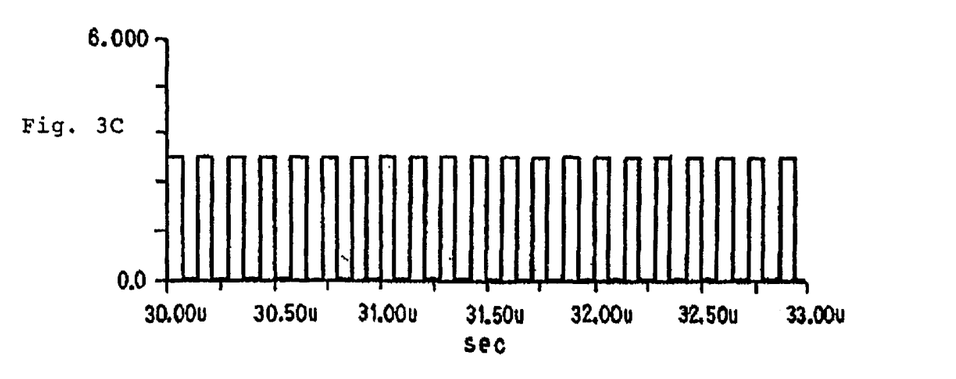

As shown in FIG. 1, in semiconductor booster circuit 100, the power-supply voltage is applied to power supply input terminal 101 from power supply unit 121, and the ground voltage is applied to ground potential terminal 102. The reference clock signal is applied as input from clock generator 122 to clock input terminal 103. Inverter 104 inverts the reference clock signal applied from clock input terminal 103, as shown in FIG. 3C.

FET transistors 105 and 106 are constituted by non-doped n-channel FET transistors, and not only is the ground voltage constantly applied from ground potential terminal 102 to the back gates, but the power-supply voltage is constantly applied from power supply input terminal 101 to the source electrodes.

Since the inverted clock signal is applied from inverter 104 to the gate electrode of FET transistor 105, the power-supply voltage applied from power supply input terminal 101 to the source electrode is conducted to the drain electrode when the inverted clock signal is at the power-supply voltage but is not conducted when the inverted clock signal is at the ground voltage.

Since the reference clock signal is applied from clock input terminal 103 to the gate electrode of FET transistor 106, the power-supply voltage that is applied to the source electrode is not conducted to the drain electrode when the reference clock signal is at the ground voltage but is conducted when the reference clock at signal is the power-supply voltage.

Capacitor 107 has its one end connected to the drain electrode of FET transistor 105, and has its other end connected to clock input terminal 103. As a result, capacitor 107 stores the power-supply voltage supplied from power supply input terminal 101 by way of FET transistor 105 to one end of capacitor 107 when the reference clock signal becomes the ground voltage and the inverted clock signal becomes the power-supply voltage. On the other hand, capacitor 107 supplies the stored power-supply voltage together with the power-supply voltage of the reference clock signal to FET transistor 109 when the reference clock signal becomes the power-supply voltage.

Capacitor 108 has its one end connected to the drain electrode of FET transistor 106 and has its other end connected to inverter 104. As a result, capacitor 108 stores the power-supply voltage supplied from power supply input terminal 101 by way of FET transistor 106 to one end of capacitor 108 when the reference clock signal becomes the power-supply voltage and the inverted clock signal becomes the ground voltage, and supplies the stored power-supply voltage together with the power-supply voltage of the inverted clock signal to FET transistor 110 when the inverted clock signal becomes the power-supply voltage.

Figure 4A:
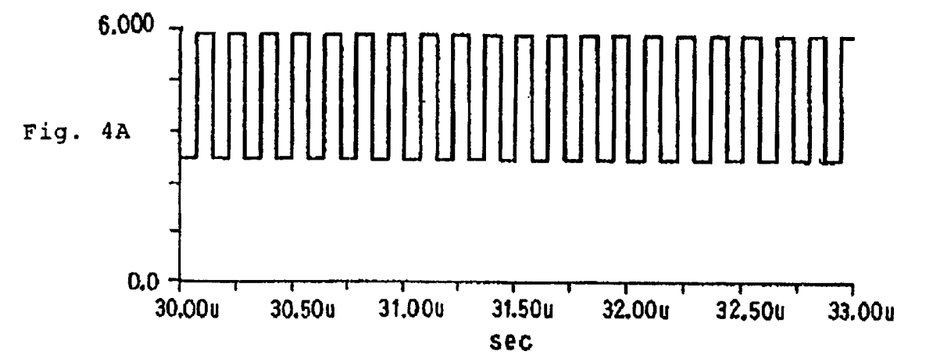
FIGS. 4A to 4C are waveform charts showing the relation between the output voltages of the first and second capacitors and the doubled voltage that is delivered to the outside.
Figure 4B:
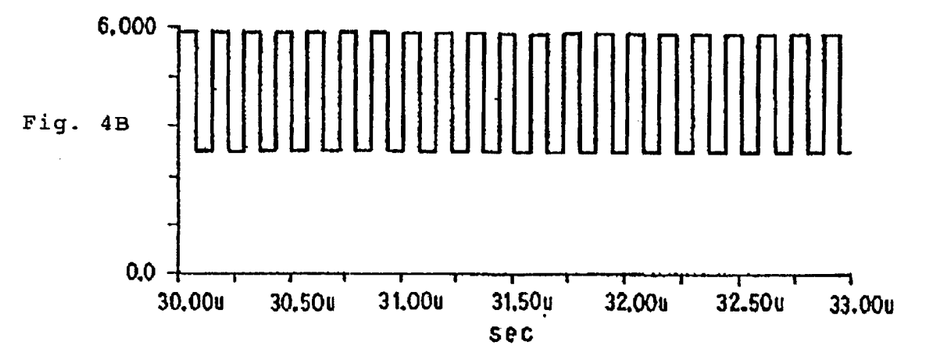
Figure 4C:
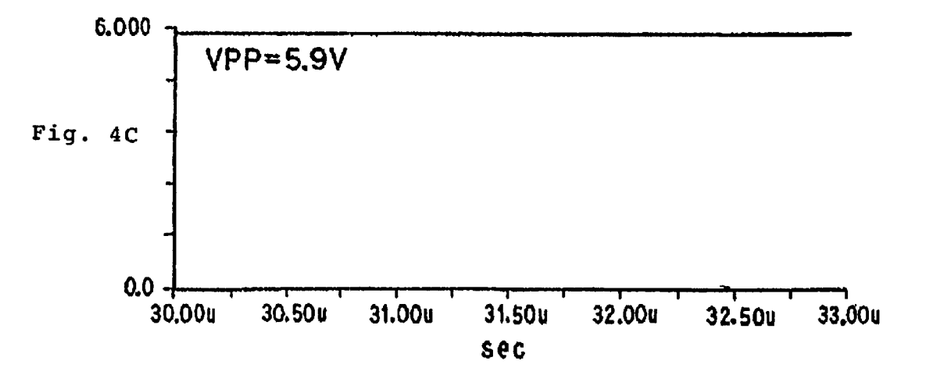
Figure 5A:
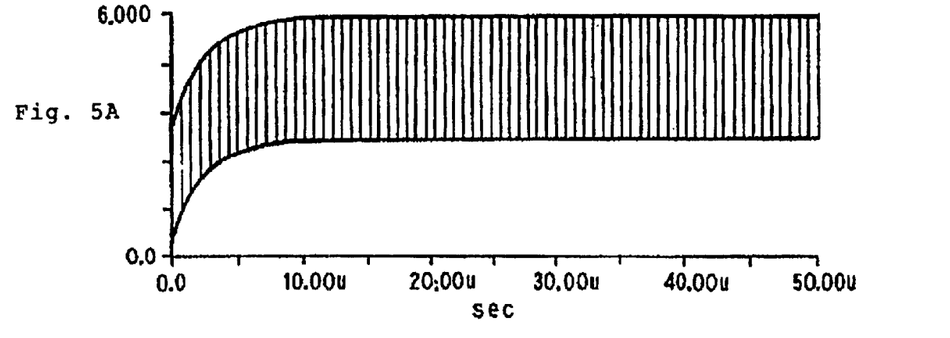
FIG. 5A to 5C are waveform charts of the output voltages of the first and second capacitors and the doubled voltage delivered to the outside immediately following activation.
Figure 5B:
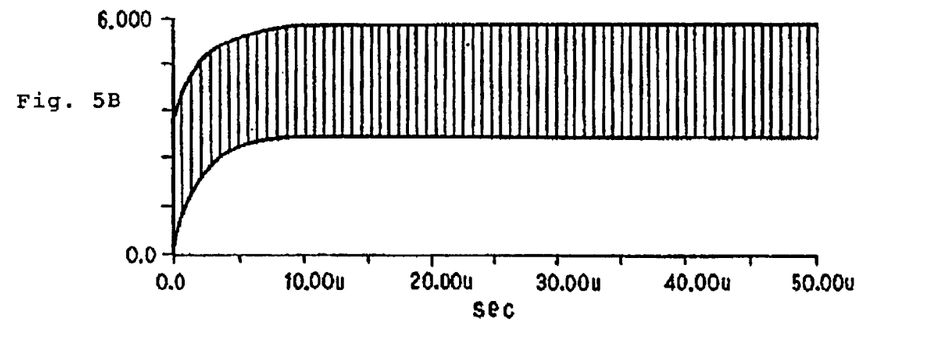
Figure 5C:
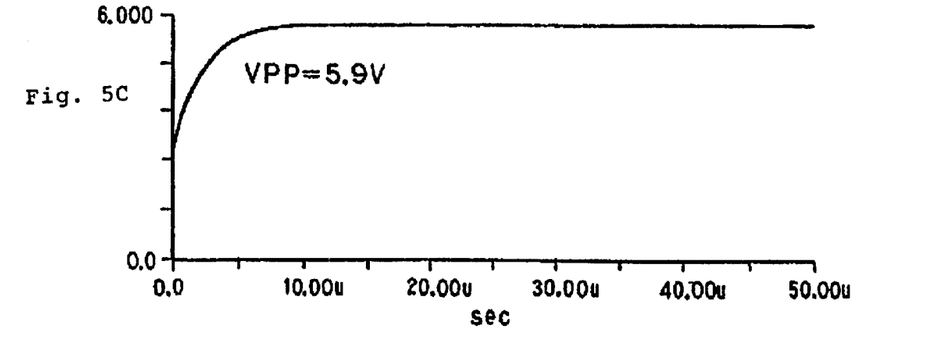

As described in the foregoing explanation, capacitors 107 and 108 store the power-supply voltage supplied from power supply input terminal 101 and provide the power-supply voltage together with the power-supply voltage of the reference clock signal and the inverted clock signal, whereby the output voltage is substantially 6.0 V, or twice the power-supply voltage. A check of the operation of semiconductor booster circuit 100 by means of a computer simulation showed that the output voltage was approximately 5.9 V, as shown in the example of FIGS. 4 and 5.

FET transistors 109 and 110 are constituted by p-channel transistors in which the source electrodes and back gates are connected to each other. FET transistor 109 has its drain electrode connected to capacitor 107 and its gate electrode connected to capacitor 108. FET transistor 110 has its drain electrode connected to capacitor 108 and its gate electrode connected to capacitor 107.

Since the stored voltage of capacitor 108 is applied to the gate electrode of FET transistor 109, the drain voltage is conducted to the source electrode when the stored voltage of capacitor 107 applied to the drain electrode is higher than the voltage obtained by adding the threshold voltage to the gate voltage of this FET transistor, but the drain voltage is not conducted when the voltage is lower.

The drain voltage of FET transistor 110 is conducted to the source electrode when the stored voltage of capacitor 108 applied to the drain electrode is higher than the voltage obtained by adding the threshold voltage to the stored voltage of capacitor 107 applied to the gate electrode, but is not conducted when the voltage is lower.

FET transistors 109 and 110 therefore alternately conduct the output voltages of capacitors 107 and 108, whereby the output voltages of capacitors 107 and 108 alternate between the power-supply voltage and a doubled voltage in synchronism with the reference clock signal and inverted clock signal, as shown in FIGS. 4A and 4B as well as in FIGS. 5A and 5B.

Capacitor 111 alternately stores the doubled voltage, which is the stored voltage of capacitor 107 and the doubled voltage, which is the stored voltage of capacitor 108, and external output terminal 112 continuously provides to the outside a doubled voltage, which is the stored voltage of capacitor 111, as shown in FIG. 5C.

In the above-described configuration of step-up power supply device 120 of the present embodiment, power supply unit 121 generates the power-supply voltage, clock generator 122 generates the reference clock signal from the power-supply voltage, and the power-supply voltage and the reference clock signal are supplied to semiconductor booster circuit 100, whereby semiconductor booster circuit 100 provides to the outside a doubled voltage, which is the power-supply voltage boosted to substantially twice its original level.

More specifically, in semiconductor booster circuit 100 of the present embodiment, the power-supply voltage is constantly applied as input to power supply input terminal 101 as shown in FIG. 3A, and the reference clock signal applied as input to clock input terminal 103 is converted by inverter 104 to an inverted clock signal, as shown in FIGS. 3B and 3C.

When the reference clock signal is at the ground voltage and the inverted clock signal is at the power-supply voltage, the power-supply voltage applied from power supply input terminal 101 to FET transistor 105 is stored in capacitor 107, and the stored voltage of capacitor 108 is delivered together with the power-supply voltage of the inverted clock signal from FET transistor 110 and through external output terminal 112.

On the other hand, when the reference clock signal is at the power-supply voltage and the inverted clock signal is at the ground voltage, the power-supply voltage applied from power supply input terminal 101 to FET transistor 106 is stored in capacitor 108, and the stored voltage of capacitor 107 is delivered together with the power-supply voltage of reference clock signal from FET transistor 109 and through external output terminal 112.

Because capacitors 107 and 108 thus alternately store the power-supply voltage of power supply input terminal 101 and alternately deliver the power-supply voltage together with the power-supply voltage of the reference clock signal and the inverted clock signal, a doubled voltage of substantially twice the power-supply voltage is continuously delivered from external output terminal 112, as shown in FIGS. 4A and 4B and FIGS. 5A and 5B.

Although semiconductor booster circuit 100 of the present embodiment is capable of boosting the power-supply voltage to substantially twice its original level as described in the foregoing explanation, the circuit features simple construction and good productivity because it does not require FET transistor elements having a breakdown voltage of substantially twice the power-supply voltage. In addition, the connection of capacitor 111 to external output terminal 112, from which the doubled voltage is alternately delivered from capacitors 107 and 108, enables the output of a doubled voltage having excellent smoothness.

In data storage device 130 of the present embodiment, write/erase circuit 132 executes data writing and data erasing of FeRAM 131 at the doubled voltage delivered to the outside by above-described step-up power supply device 120, thereby enabling data writing/erasing of FeRAM 131, which requires a voltage of approximately twice the typical power-supply voltage.

The present invention is not limited to the above-described embodiment, and various modifications are possible within a scope that does not depart from the gist of the invention. For example, semiconductor booster circuit 100 of the present embodiment was described using a case in which an inverted clock signal from inverter 104 was applied to the gate electrode of FET transistor 105 and the reference clock signal from clock input terminal 103 was applied to the gate electrode of FET transistor 106.

Figure 6:
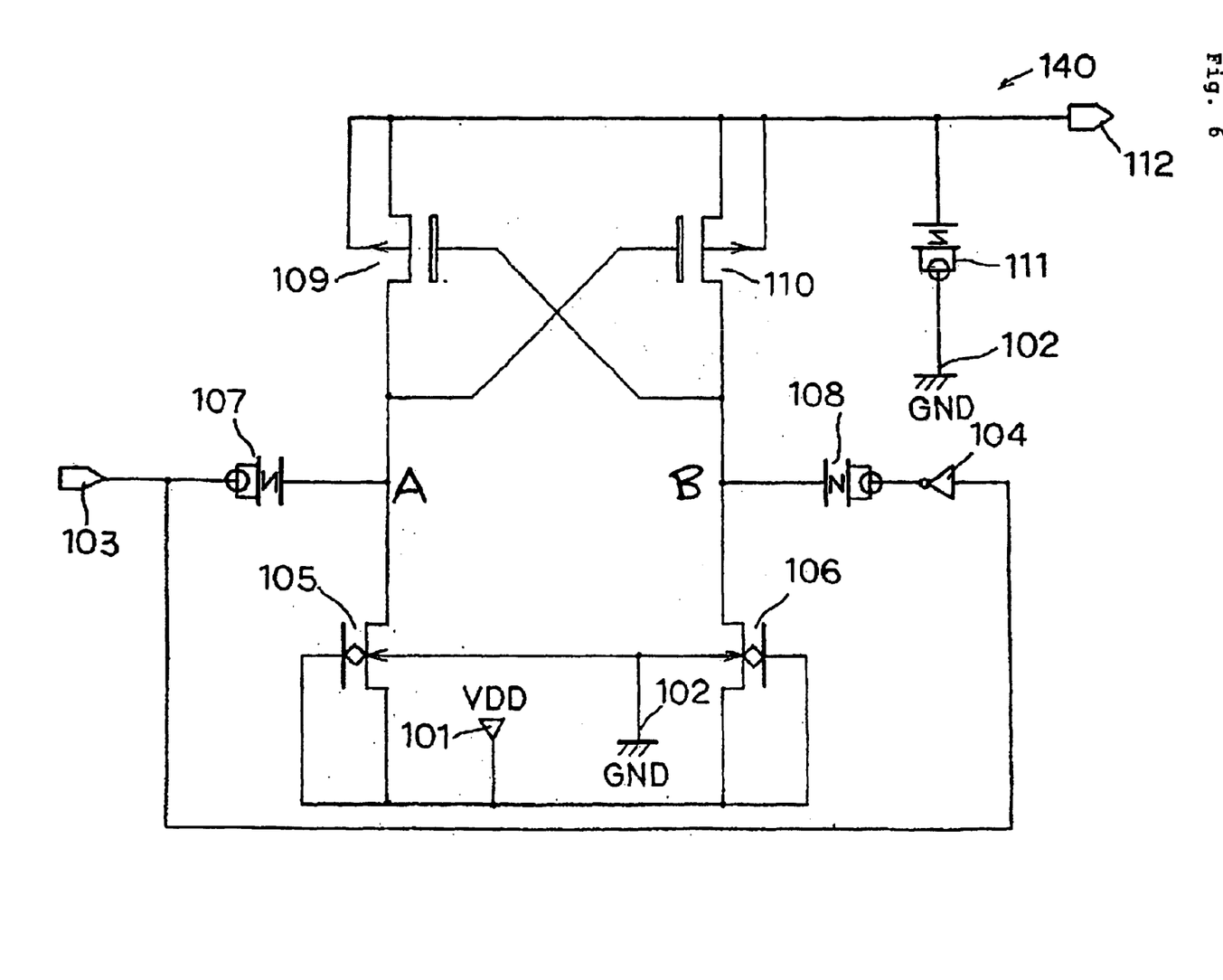
FIG. 6 is a circuit diagram of a present semiconductor booster circuit according to a second embodiment of the present invention.

However, as in the example of semiconductor booster circuit 140 shown in FIG. 6, the power-supply voltage may be applied from power supply input terminal 101 to both the gate electrodes and source electrodes of FET transistors 105 and 106. In such a case, the stored voltage of capacitors 107 and 108 is applied to the drain electrodes of FET transistors 105 and 106, and as a result, the power-supply voltage of the source electrodes is conducted to the drain electrodes when the power-supply voltage applied to the gate electrodes and source electrodes is lower than the voltage obtained by subtracting the threshold voltage from the drain voltages.

Semiconductor booster circuit 140 according to the foregoing explanation therefore functions in the same manner as the previously described semiconductor booster circuit 100, but enables a further simplification of construction and a further improvement in productivity to be achieved by merely connecting power supply input terminal 101 together with the source electrodes to the gate electrodes of FET transistors 105 and 106.

Figure 7:
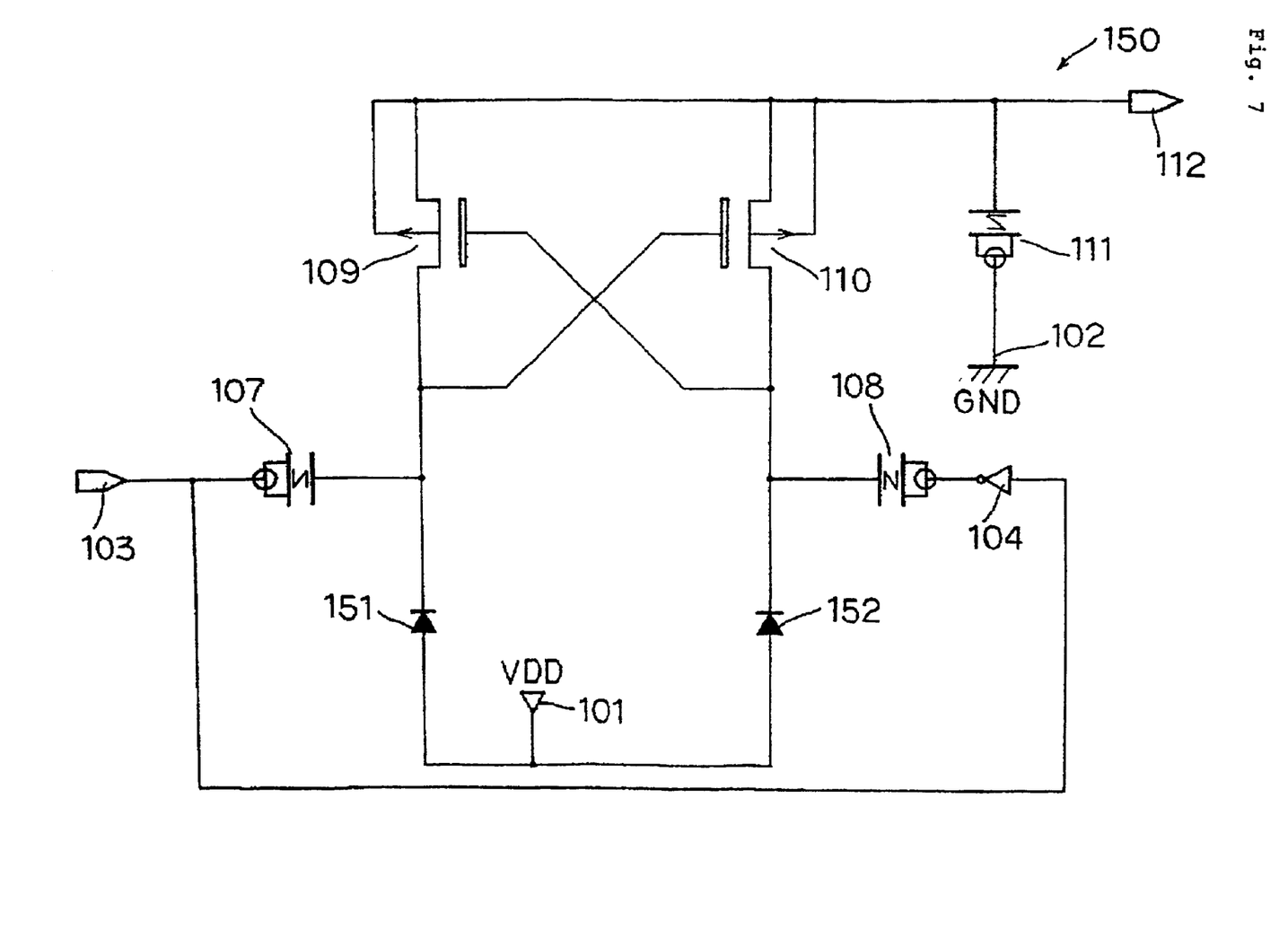
FIG. 7 is a circuit diagram of a semiconductor booster circuit according to a third embodiment of the present invention.

Finally, FET transistors 105 and 106 may be replaced by diodes 151 and 152 having anodes connected to power supply input terminal 101 and cathodes connected to capacitor 107 and 108, as in semiconductor booster circuit 150 shown in FIG. 7. In this case as well, semiconductor booster circuit 150 functions in the same manner as the previously described semiconductor booster circuits 100 and 140, but a further simplification of circuit structure and a further improvement in productivity can be achieved.

While preferred embodiments of the present invention have been described using specific terms, such description is for illustrative purposes only, and it is to be understood that changes and variations may be made without departing from the spirit or scope of the following claims.

What is claimed is:

1. A step-up power supply device comprising a semiconductor booster circuit, comprising:
   a power supply input terminal being supplied with a power-supply voltage;
   a clock input terminal being supplied with a reference clock signal of a predetermined duty cycle that alternates between said power-supply voltage and a ground voltage;

a clock inverting circuit connected to said clock input terminal providing a clock signal generated by inverting said reference clock signal;

a first capacitor having its one end connected to said clock input terminal;

a second capacitor having its one end connected to the output of said clock inverting circuit;

a first FET transistor of a first conduction type having its drain electrode connected to the other end of said first capacitor and its gate electrode connected to the other end of said second capacitor;

a second FET transistor of the first conduction type having its drain electrode connected to the other end of said second capacitor and its gate electrode connected to the other end of said first capacitor;

a third FET transistor of a second conduction type having its source electrode connected to said power supply input terminal, its gate electrode connected to the output of said clock inverting circuit, and its drain electrode connected to the other end of said first capacitor, the drain electrode of said first FET transistor, and the gate electrode of said second FET transistor;

a fourth FET transistor of the second conduction type having its source electrode connected to said power supply input terminal, its gate electrode connected to said clock input terminal, and its drain electrode connected to the other end of said second capacitor, the drain electrode of said second FET transistor, and the gate electrode of said first FET transistor; and an external output terminal connected to the source electrodes of said first and second FET transistors, the gate electrode of the first FET transistor not being directly connected to the gate electrode of the third FET transistor and the gate electrode of the second FET transistor not being directly connected to the gate electrode of the fourth FET transistor.

2. A device according to claim 1, wherein said third and fourth FET transistors are turned on when said power-supply voltage is applied to said gate electrodes of said third and fourth FET transistors.

3. A step-up power supply device according to claim 1, further comprising a third capacitor connected between said external output terminal and a ground potential terminal.

4. A step-up power supply device according to claim 1 further comprising:

a power supply unit for generating the power-supply voltage and applying the power-supply voltage to the power supply input terminal of said semiconductor booster circuit; and a clock generation means for generating said reference clock signal from said power-supply voltage generated by said power supply unit and supplying said reference clock signal to the clock input terminal of said semiconductor booster circuit.

* * * * *